Z. WHEELER.

Machine for Collecting Amalgam and Mercury from Ore Pulp.

No. 1,669. Reissued May 10, 1864.

Witnesses
G. Crombs
G. W. Reed

Inventor
Zenas Wheeler
per Munn & Co
Attorneys

N. PETERS, Photo-Lithographer, Washington, D. C.

UNITED STATES PATENT OFFICE.

ZENAS WHEELER, OF SAN FRANCISCO, CALIFORNIA.

IMPROVED MACHINE FOR COLLECTING AND SEPARATING AMALGAM AND MERCURY FROM ORE-PULP.

Specification forming part of Letters Patent No. 39,251, dated July 14, 1863; Reissue No. 1,669, dated May 10, 1864.

*To all whom it may concern:*

Be it known that I, ZENAS WHEELER, of San Francisco, in the county of San Francisco and State of California, have invented a new and improved device for separating amalgam and pulverized mercury from the waste matter or pulp which escapes from the ordinary gold and silver amalgamators; and I do hereby declare that the following is a full, clear, and exact description of the same, reference being had to the accompanying drawings, making a part of this specification, in which—

Figure 1:
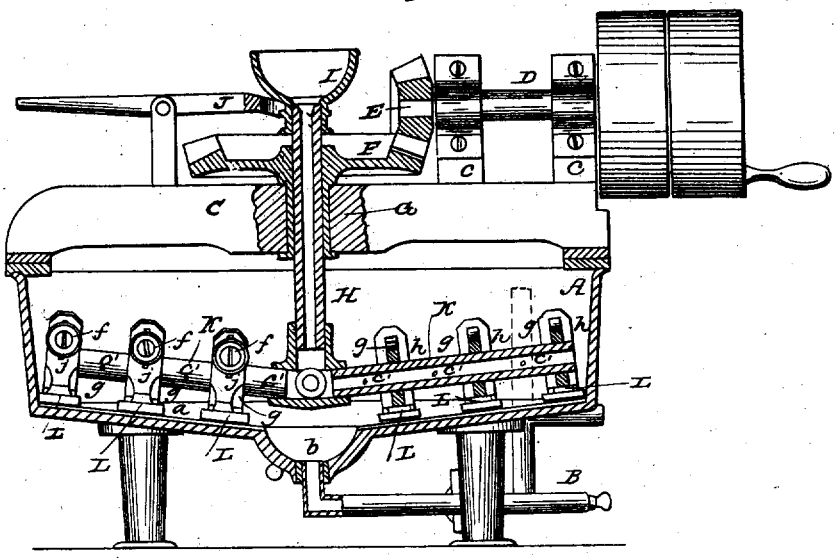
Figure 2:
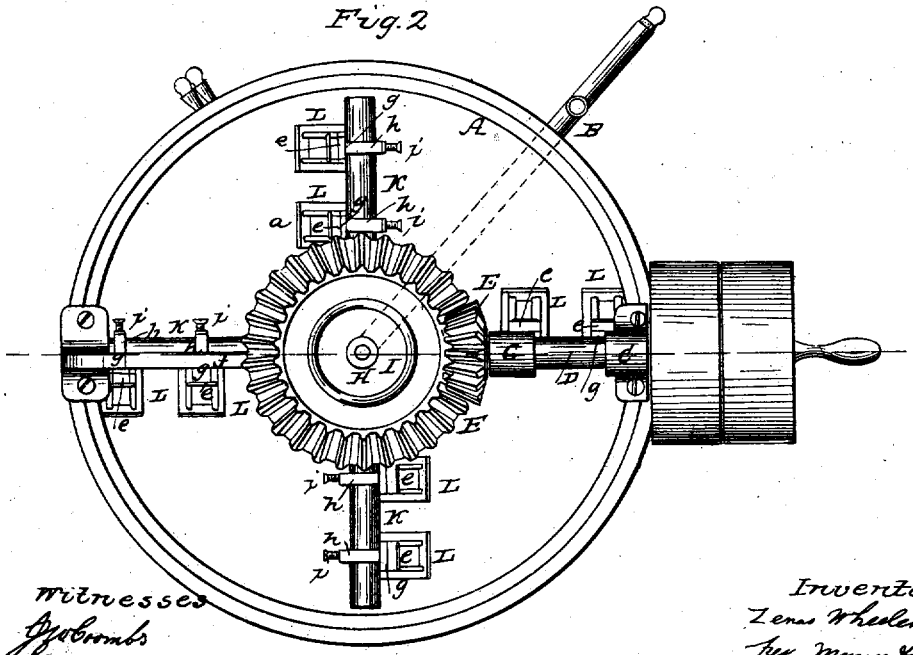

Figure 1 is a vertical central section of my invention, taken in the line *x x*, Fig. 2; Fig. 2, a plan or top view of the same.

Similar letters of reference indicate corresponding parts in the two figures.

The invention consists in the employment or use of a tub provided with a concave bottom, having a central receiving-chamber and outlets, and using in connection therewith perforated revolving tubular arms provided with pads, all being arranged in such a manner as hereinafter fully shown and described.

To enable those skilled in the art to fully understand and construct my invention, I will proceed to describe it.

A represents a wooden tub of any convenient size, and provided with a bottom, *a*, of concave form, said bottom being covered with a metallic plate or constructed entirely of metal, as may be desired. At the center of the bottom *a* there is a chamber, *b*, of semi-spheroidal form, and having an inclined tube, B, extending from its lower end.

C is a cross-bar, which is secured to the upper edge of the tub A, and has two vertical bars, *c c*, attached to it, in which a driving-shaft, D, is fitted, said shaft having a bevel-pinion, E, on its inner end, which pinion gears into a bevel-wheel, F, on the upper part of a sleeve or collar, G, the latter being fitted and allowed to rotate freely in the cross bar C. (See Fig. 1.)

H is a tubular shaft, which passes through the sleeve or collar G of the wheel F, and is allowed to slide freely up and down therein, but the wheel F is made to rotate the shaft H by means of the well-known device of a feather and groove. To the upper end of the shaft H there is affixed a funnel, I, and a lever, J, is connected with the upper end of the shaft H for the purpose of raising it when required.

K represents four tubular arms, which are attached radially to the lower end of the tubular shaft H, and communicate therewith. These tubular arms extend nearly to the side of the tub A, and they are perforated at their lower parts, as shown at *c'* in Fig. 1.

To the arms K there are attached a series of pads, L, which are composed of flat plates attached to the lower ends of vertical bars *e*, which are secured by set-screws *f* to plates *g*, the latter being attached to the arms K by clasps or bands *h*, which encompass said arms and are secured thereto by set-screws *i*. The set-screws *f* pass through oblong slots *j* in the bars *e* and into the plates *g*. This arrangement, it will be seen, admits of the pads L being adjusted higher or lower and also in a more or less inclined position. The pads L may be of wood, metal, india-rubber, or any other material best calculated for collecting mercury. The tube B extends beyond the periphery of the bottom *a*, in the end of which is a plug or cock, $a^{\times}$, for drawing off the entire contents of the chamber *b*. To the tube B, near its outer end, is attached an upright tube, $b^{\times}$, having an outlet or branch, $c^{\times}$, on a level with the surface of the mercury in the chamber *b*. This outlet or branch is always open for the egress of the mercury as fast as it accumulates in the separator.

The pulp, after being acted upon by the ordinary gold and silver amalgamating machines, is placed in the tub A, and rotary motion is communicated to the tubular shaft H and arms K through the medium of the gearing previously described the chamber *b* and tube B having been filled with mercury previous to any pulp being introduced into the machine. The pads L, as they rotate through the pulp, will collect the particles of fine or pulverized mercury and amalgam, which, as they attain a certain size and increase in weight, roll down into the chamber *b*, the pulp is diluted with water through the tubular shaft H and arms K or outside of them. As the mercury and amalgam accumulates in the chamber *b*, the mercury flows out through the outlet or branch $c^{\times}$ of the upright tube $b^{\times}$, the tube B thus regulating the amount of mercury in the machine, so as to insure its proper working.

Having thus described my invention, what I claim as new, and desire to secure by Letters Patent, is—

1. The tub A, provided with a concave bottom, *a*, and chamber *b*, in combination with the rotating pads L, as and for the purpose specified.

2. In combination with the pads L, concave bottom *a*, and chamber *b* of the tub A, the tubular shaft H and arms K, all arranged for joint operation as and for the purpose specified.

3. The perpetual and self-regulating discharge of the mercury from under the pulp in the separator through the medium of the chamber *b*, tubes B *b'*, and outlet or branch *c'*, or their equivalents, in the manner and for the purpose set forth.

ZENAS WHEELER.

Witnesses:
R. H. SINTON,
H. O. HERBERT.